US011536336B2

(12) United States Patent
Hämmerl et al.

(10) Patent No.: US 11,536,336 B2
(45) Date of Patent: Dec. 27, 2022

(54) AXLE-MOUNTED BRAKE DISK FOR A RAIL VEHICLE

(71) Applicant: KNORR-BREMSE SYSTEME FÜR SCHIENENFAHRZEUGE GMBH, Munich (DE)

(72) Inventors: Bernhard Hämmerl, Maisach (DE); Marc-Gregory Elstorpff, Munich (DE); Martin Schmid, Munich (DE); Nils Arkenberg, Munich (DE); Thomas Volk, Munich (DE)

(73) Assignee: KNORR-BREMSE SYSTEME FÜR SCHIENENFAHRZEUGE GMBH

( * ) Notice: Subject to any disclaimer, the term of this patent is extended or adjusted under 35 U.S.C. 154(b) by 0 days.

(21) Appl. No.: 16/329,513

(22) PCT Filed: Aug. 9, 2017

(86) PCT No.: PCT/EP2017/070151
§ 371 (c)(1),
(2) Date: Feb. 28, 2019

(87) PCT Pub. No.: WO2018/041562
PCT Pub. Date: Mar. 8, 2018

(65) Prior Publication Data
US 2019/0195300 A1 Jun. 27, 2019

(30) Foreign Application Priority Data
Aug. 29, 2016 (DE) .................. 10 2016 115 996.4

(51) Int. Cl.
*F16D 65/12* (2006.01)
*F16D 65/847* (2006.01)
*F16D 65/02* (2006.01)

(52) U.S. Cl.
CPC ......... *F16D 65/124* (2013.01); *F16D 65/128* (2013.01); *F16D 65/847* (2013.01);
(Continued)

(58) Field of Classification Search
CPC ........... F16D 65/128; F16D 2065/1316; F16D 2065/1328; F16D 65/847; F16D 2065/132;
(Continued)

(56) References Cited

U.S. PATENT DOCUMENTS 2,410,195 A * 10/1946 Baselt .................. F16D 65/123
188/218 R
4,865,167 A * 9/1989 Giorgetti ............... F16D 65/128
188/218 XL
(Continued)

FOREIGN PATENT DOCUMENTS

CN 201535333 U 7/2010
CN 102239345 A 11/2011
(Continued)

OTHER PUBLICATIONS

International Search Report and Written Opinion for International Patent Application No. PCT/EP2017/070151; dated Oct. 24, 2017.
(Continued)

*Primary Examiner* — Robert A. Siconolfi
*Assistant Examiner* — Mahbubur Rashid
(74) *Attorney, Agent, or Firm* — Barnes & Thornburg LLP

(57) ABSTRACT

The invention relates to an axle-mounted brake disk for a rail vehicle, comprising two friction rings which are arranged in parallel and at a distance from each other and are interconnected by a plurality of ribs extending in the direction of the rotational axis of the friction rings, where at least some of the ribs are embodied with different cross-sections from (Continued)

each other, where the cross-sections of a first subset of the ribs, embodied as supporting elements transmitting pressure forces, do not fall below a minimum cross-section, defined by the stability required in relation to the mechanical load during a brake process, and the cross-section of a second subset of the ribs, used to radiate thermal energy, falls below the minimum cross-section.

6 Claims, 2 Drawing Sheets

(52) U.S. Cl.
CPC .............. *F16D 2065/132* (2013.01); *F16D 2065/1316* (2013.01); *F16D 2065/1328* (2013.01); *F16D 2200/0013* (2013.01)

(58) Field of Classification Search
CPC ..... F16D 2200/0013; F16D 2065/1356; F16D 2069/004; F16D 65/124; F16D 2065/1332; F16D 2065/134; F16D 2065/788; F16D 2065/789
See application file for complete search history.

(56) References Cited

U.S. PATENT DOCUMENTS

| | | | | |
|---|---|---|---|---|
| 4,928,798 A * | 5/1990 | Watson | ............... | F16D 65/0006 188/218 XL |
| 5,188,203 A * | 2/1993 | Winter | ................. | F16D 65/123 188/218 XL |
| 5,526,905 A * | 6/1996 | Shimazu | ................... | B60T 5/00 188/218 XL |
| 5,542,503 A * | 8/1996 | Dunn | .................... | F16D 65/128 188/18 A |
| 6,142,267 A * | 11/2000 | Sporzynski | ............ | F16D 65/12 188/218 XL |
| 6,193,023 B1 * | 2/2001 | Telfer | ...................... | F16D 65/12 188/264 A |
| 6,367,599 B2 * | 4/2002 | Kobayashi | ............ | F16D 65/128 188/218 XL |
| 7,032,724 B1 * | 4/2006 | Hulten | ................... | F16D 65/128 188/18 A |
| 7,097,010 B1 | 8/2006 | Hulten et al. | | |
| 8,251,190 B2 * | 8/2012 | Gey | ...................... | F16D 65/128 188/264 A |
| 8,733,517 B2 * | 5/2014 | Tironi | ................... | F16D 65/128 188/218 XL |
| 9,022,182 B2 * | 5/2015 | Cavagna | ............... | F16D 65/128 188/218 XL |
| 9,080,625 B2 * | 7/2015 | Oberti | ................... | F16D 65/128 |
| 9,506,515 B2 * | 11/2016 | White | .................. | F16D 65/847 |
| 9,574,629 B2 * | 2/2017 | Torres Gutierrez | .. | F16D 65/128 |
| 2004/0178029 A1 * | 9/2004 | Hoyte | ..................... | F16D 65/12 188/218 XL |
| 2004/0178031 A1 * | 9/2004 | Gotti | ..................... | F16D 65/123 188/218 XL |
| 2006/0243546 A1 * | 11/2006 | Oberti | ................... | F16D 65/123 188/218 XL |
| 2007/0144840 A1 * | 6/2007 | Goller | ................... | F16D 65/126 188/218 XL |
| 2007/0181390 A1 * | 8/2007 | Korm | .................... | F16D 65/128 188/218 XL |
| 2009/0000884 A1 | 1/2009 | Layton et al. | | |
| 2010/0089710 A1 * | 4/2010 | Franke | .................... | F16D 65/12 188/218 XL |
| 2010/0187053 A1 * | 7/2010 | Botsch | ................. | F16D 65/123 188/218 XL |
| 2011/0127125 A1 * | 6/2011 | Finch, Jr. | ................. | B61H 5/00 188/218 XL |
| 2013/0092486 A1 * | 4/2013 | Gebauer | ............... | F16D 65/847 188/218 XL |
| 2013/0098717 A1 * | 4/2013 | Hantschke | .............. | F16D 65/12 188/218 XL |
| 2014/0000995 A1 * | 1/2014 | Hentrich | ............... | F16D 65/128 188/218 XL |
| 2014/0158486 A1 * | 6/2014 | Schorn | .................... | F16D 65/12 188/218 XL |
| 2015/0232108 A1 * | 8/2015 | Mosbach | ................. | B61H 5/00 188/218 XL |
| 2015/0323025 A1 * | 11/2015 | Muruzabal Rivero | ...................... | F16D 65/128 188/218 XL |

FOREIGN PATENT DOCUMENTS

| | | |
|---|---|---|
| CN | 204784333 U | 11/2015 |
| CN | 205371392 U | 7/2016 |
| DE | 3102429 A1 | 10/1982 |
| DE | 3320543 A1 | 12/1984 |
| DE | 3527577 A1 | 2/1987 |
| DE | 1018961 A1 | 12/1991 |
| DE | 19841096 C1 | 1/2000 |
| DE | 60029610 T2 | 7/2007 |
| DE | 202008008478 U1 | 1/2009 |
| EP | 0211304 A | 2/1987 |
| GB | 2060796 A | 5/1981 |

OTHER PUBLICATIONS

Chinese Office Action corresponding to 201780053106.X, dated Nov. 5, 2019.

* cited by examiner

AXLE-MOUNTED BRAKE DISK FOR A RAIL VEHICLE

CROSS REFERENCE AND PRIORITY CLAIM

This patent application is a U.S. National Phase of International Patent Application No. PCT/EP2017/070151, filed Aug. 9, 2017, which claims priority to German Patent Application No. 10 2016 115 996.4 Aug. 29, 2016, the disclosure of which being incorporated herein by reference in their entireties.

FIELD

Disclosed embodiments concern an axle-mounted brake disk for a rail vehicle.

BACKGROUND

Generic axle-mounted brake disks for rail vehicles are normally made of a cast material, for example grey cast iron. Two parallel friction rings which are arranged spaced apart from each other are connected together by ribs extending in the direction of the rotation axis of the axle-mounted brake disk. The ribs are usually formed identically. In particular, the plurality of ribs connecting the friction rings together have the same diameter.

The arrangement of the ribs relative to each other is usually optimized with regard to ease of casting and to be as defect-free as possible, in order thus to keep production costs low.

SUMMARY

A disadvantage of the axle-mounted brake disks known from the prior art is their large mass. The mass of an axle-mounted brake disk made from grey cast iron, with an outer diameter of 590 mm and a width of 170 mm, and in which the friction rings are 25.5 mm thick, is more than 140 kg. To this extent, there is a need for modified axle-mounted brake disks with reduced mass and the same performance capacity. The cooling capacity is important for achieving the same performance level of such axle-mounted brake disks.

Disclosed embodiments provide an axle-mounted brake disk which is lighter than a conventional axle-mounted brake disk, while retaining the same performance capacity as the axle-mounted brake disks of the generic type.

BRIEF DESCRIPTION OF THE FIGURES

An exemplary embodiment is explained in more detail below with reference to the attached drawings.

The drawings show.

Figure 1:
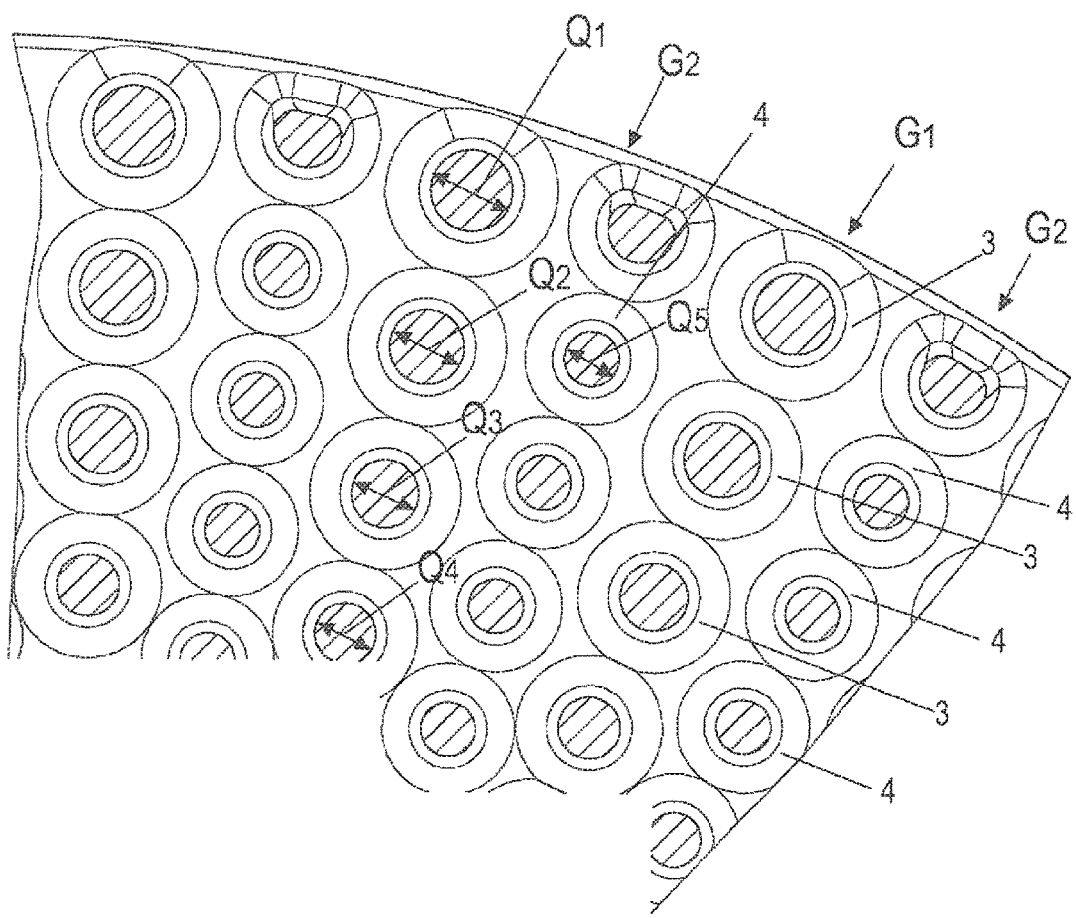
FIG. 1 a diagrammatic, sectional depiction of a partial extract of a friction ring inner face with ribs extending from this, FIG. 2 a diagrammatic, sectional depiction of part of the axle-mounted brake disk in a sectional plane running parallel and radially to the rotation axis of the axle-mounted brake disk.

In the description of the figures which follows, terms such as top, bottom, left, right, front, rear etc. refer exclusively to the exemplary depiction and position of the axle-mounted brake disk, friction ring, rib, supporting element and similar selected in the respective figures. These terms should not be understood restrictively, i.e. these references may change due to different working positions or mirror-symmetrical layouts or the like.

DETAILED DESCRIPTION

It has been unexpectedly found that, by forming the axle-mounted brake disk according to the invention, by adapting the ribs, in particular their diameter, it is possible to produce such a weight-reduced axle-mounted brake disk with the same performance capacity.

The axle-mounted brake disk according to the invention, comprising two friction rings which are arranged parallel to and spaced apart from each other and connected together by a plurality of ribs extending in the direction of the rotation axis of the friction rings, is distinguished in that at least some of the ribs are formed with differing cross-sections, wherein the at least one cross-section of a first subset of the ribs, which are configured as supporting elements transmitting pressure forces, exceeds a minimum cross-section, and the at least one cross-section of a second subset of the ribs, serving to dissipate thermal energy, is less than the minimum cross-section.

With an axle-mounted brake disk formed in this manner, because of the differing diameter of the ribs which are now divided with regard to their function into thermal and mechanical ribs, it is possible to increase the packing density of the ribs and hence enlarge the cooling surface area.

Enlarging the surface area of the cooling channels is the essential factor for increasing the cooling capacity, so that by enlarging the area of the cooling channels, it is possible to use an axle-mounted brake disk with a width of for example 110 mm instead of a conventional axle-mounted brake disk with a width of 140 mm, which is associated with a mass reduction of 30%.

The mass reduction of the axle-mounted brake disk has the advantage that in this way, the payload of the rail vehicle may be increased accordingly, and in addition the proportion of unsprung mass is reduced.

By forming a subset of the ribs with a cross-section which exceeds a predefined minimum cross-section, it is possible to use these ribs to absorb the mechanical load and use the other ribs substantially to dissipate thermal energy, so that the diameter of the ribs serving fundamentally for dissipation of thermal energy may be smaller than the minimum cross-section which would be necessary to transmit mechanical pressure forces.

According to an embodiment variation, several of the ribs of the first subset are arranged behind each other radially to the rotation axis of the friction rings.

Optionally, also several of the ribs of the second subset are arranged behind each other radially to the rotation axis of the friction rings. This allows the sand used in production of the mold for the axle-mounted brake disk to fill the mold well, and ensures a high-quality formation of the structure and surface.

The arrangement of the ribs in such radial rays also allows a higher packing density of the ribs with comparable mold quality to an offset rib arrangement.

According to a further embodiment variant of the invention, the number of ribs of the second subset arranged radially behind each other is greater than the number of ribs of the first subset arranged radially behind each other.

Thus the formation of the ribs with reduced cross-section in the second subset allows the formation of a larger number of radially arranged ribs, whereby the cooling channel area is further enlarged.

In order to utilize optimally the arrangement area for the ribs on the mutually facing insides of the friction rings, according to a further embodiment variant, the radially arranged rows of ribs formed as supporting elements and ribs serving for thermal energy dissipation are arranged alternately next to each other in the circumferential direction.

According to a further embodiment variant, the cross-section of the ribs of at least one subset of ribs is formed so as to increase towards an outer edge of the friction rings.

Another possibility for enlarging the cooling channel area is achieved in a further embodiment variant of the invention in that the length of the ribs close to an inner edge of the friction rings is greater than the length of the ribs close to an outer edge of the friction rings. The thickness of the friction rings in the region of their inner edge is reduced accordingly.

In this way, as well as enlarging the cooling channel area, the air inflow in the region of the inner diameter of the friction rings is also improved.

In a particular embodiment variant of the axle-mounted brake disk according to the invention, the ratio of the cross-section of the ribs formed as supporting elements to the cross-section of the ribs serving for thermal energy dissipation is 3:2.

The cross-section of the ribs is optionally round. It is also conceivable that the cross-section of the ribs is formed to be oval or also polygonal.

Figure 2:
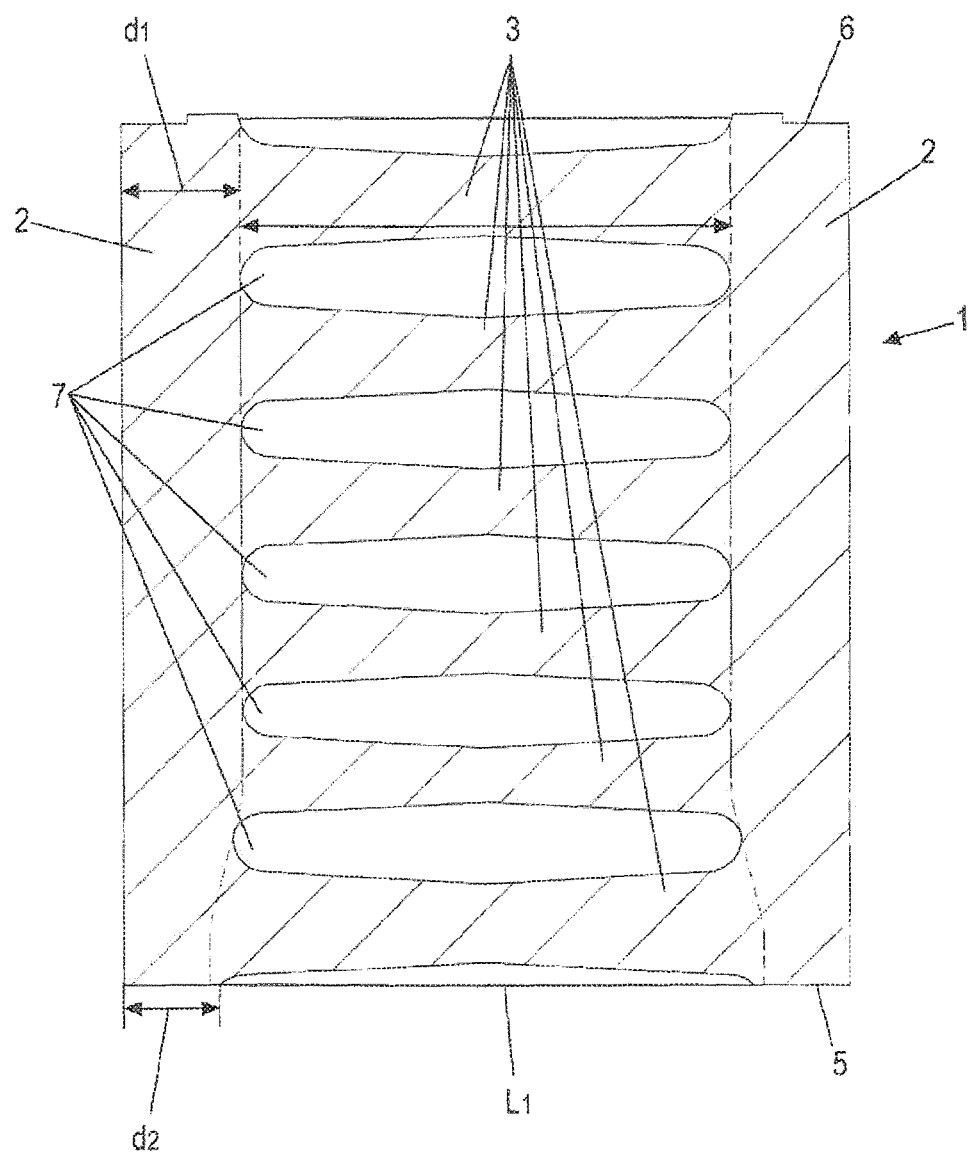

FIGS. 1 and 2 each show partial extracts of an axle-mounted brake disk 1 for a rail vehicle. The axle-mounted brake disk 1 has two friction rings 2 arranged parallel to and spaced apart from each other. The friction rings 2 are connected together by a plurality of ribs 3, 4, in particular cast on, which extend in the direction of a rotation axis and hence perpendicularly to the friction surface of the friction rings 2.

The axle-mounted brake disk 1 is connected to a vehicle-side hub or shaft (not shown) via one or more connecting elements, for example in the form of retaining tabs or a brake disk pot.

As shown in FIG. 1, some of the ribs 3, 4 are formed with differing cross-sections $Q_1$, $Q_2$, $Q_3$, $Q_4$, $Q_5$. A subset Gi of the ribs, marked with reference sign 3, have a cross-section $Q_1$, $Q_2$, $Q_3$, $Q_4$ which is greater than or equal to a predefined minimum cross-section $Q_{min}$.

This minimum cross-section $Q_{min}$ is defined by the necessary resistance to mechanical loads which are exerted on the two friction rings 2 during a braking process and must be absorbed by the ribs 3.

A second group of ribs carrying reference sign 4 serves to dissipate thermal energy. The cross-section $Q_5$ of these ribs 4 of the second subset $G_2$ is smaller than the minimum cross-section $Q_{min}$.

This measure allows the cooling channel surface area of the axle-mounted brake disk 1 to be enlarged by arranging these ribs 4, which are not mechanically necessary, between the friction rings 2.

The ribs 3 of the first subset $G_1$ are, as shown in FIG. 1, optionally arranged behind each other radially to the rotation axis of the friction rings 2.

Also, the ribs 4 of the second subset $G_2$ are optionally arranged so that the rows of these ribs 4 are arranged behind each other radially to the rotation axis of the friction rings 2. This allows in particular a simple production of a mold for casting such an axle-mounted brake disk 1.

As furthermore shown as an example in FIG. 1, the number of ribs 4 of the second subset $G_2$ which are arranged radially behind each other is greater than the number of ribs 3 of the first subset $G_1$ which are arranged radially behind each other.

This is achieved by forming the ribs 4 of the second subset $G_2$ with a smaller cross-section $Q_5$. The resulting higher packing density of the ribs 4 is accordingly accompanied by an enlargement of the cooling channel area of the axle-mounted brake disk 1.

To achieve a maximum packing density of the ribs 3, 4 and the associated large cooling channel area, the radially arranged rows of ribs 3 formed as supporting elements and the ribs 4 serving to dissipate thermal energy are arranged alternately next to each other in the circumferential direction. The alternating arrangement of the differently formed ribs 3, 4 also allows an even transmission of pressure forces through the ribs 3 which are formed as supporting elements.

However, other arrangement patterns of the ribs 3, 4 are also conceivable. The important factors are a highest possible packing density of the ribs 3, 4, and a sufficient number of ribs 3 formed a supporting elements for transmission of pressure forces onto the friction rings 2.

To further increase the cooling channel area, as shown in FIG. 1, the cross-section of the ribs 3, 4 of at least one of the subsets $G_1$, $G_2$ of the ribs 3, 4 is formed so as to increase towards an outer edge of the friction rings 2. In the embodiment variant shown in FIG. 1, the ribs 3 formed as supporting elements are formed with different cross sections $Q_1$, $Q_2$, $Q_3$, $Q_4$. The ribs 4 serving to dissipate thermal energy are here formed with constant cross-section Q.

FIG. 2 shows a further possibility for enlarging the cooling channel area of the axle-mounted brake disk 1. As is clearly evident here, the length $L_1$ of the ribs 3, 4 close to the inner edge 5 of the friction rings 2 is greater than the length $L_2$ of the ribs 3, 4 close to the outer edge 6 of the friction rings 2. Consequently, the thickness $d_2$ of the friction rings 2 close to their inner edge 5 is reduced accordingly.

Whereas in FIG. 2, only the two innermost ribs 3 have a longer length than the ribs 3 close to the outer edge 6 of the axle-mounted brake disk 1, it is also conceivable to form the thickness of the friction rings 2 so as to decrease continuously from the thickness $D_1$ in the region of the outer edge to the thickness $D_2$ in the region of the inner edge 5, and accordingly the lengths L of the ribs 3, 4 increase continuously from the outside to the inside.

A particularly favorable size ratio of the cross-section of the ribs 3 formed as support elements to the cross-section of the ribs 4 serving for the dissipation of thermal energy has been found to be 3:2. Thus the cross-section of the ribs 3 formed as support elements is for example 12 mm while the cross-section of the ribs 4 serving to dissipate thermal energy is 8 mm The form of the cross-section of the ribs 3, 4 is optionally round, as shown in FIG. 1. However, it is also conceivable to form the ribs 3, 4 with oval or polygonal cross-section.

LIST OF REFERENCE SIGNS

1 Axle-mounted brake disk
2 Friction ring
3 Rib
4 Rib
5 Inner edge
6 Outer edge
Q Cross-section of rib
$Q_{min}$ Minimum cross-section
$G_1$ First group
$G_2$ Second group $L_1$ Length of rib
$L_2$ Length of rib
$d_2$ Thickness of friction rings

The invention claimed is:

1. An axle-mounted brake disk for a rail vehicle, the brake disk comprising:
    two friction rings arranged parallel to and spaced apart from each other and connected together by a plurality of ribs extending in a direction of a rotation axis of the friction rings,
    wherein at least some of the plurality of ribs-are formed with differing cross-sections,
    wherein at least one cross-section of a first subset of the plurality of ribs, which are configured as supporting elements for transmitting pressure forces, exceeds a predefined minimum cross-section,
    wherein at least one cross-section of a second subset of the plurality of ribs, serving to dissipate thermal energy, is less than the minimum cross-section,
    wherein several of the ribs of the first subset are arranged behind each other in a row along a common axis extending radially from the rotation axis of the friction rings and all of the ribs along the common axis exceed the predefined minimum cross-section, and
    wherein several of the ribs of the second subset are arranged behind each other in a row along a second common axis, which is spaced apart from the several ribs of the first subset, extending radially from the rotation axis of the friction rings and all of the ribs along the second common axis are less than the minimum cross-section,
    wherein the axle-mounted brake disk includes a plurality of radially arranged rows of ribs formed as supporting elements and a plurality of rows of ribs serving for dissipating thermal energy,
    wherein each single radially arranged row of the plurality of rows of ribs formed as supporting elements having a cross-sections that exceed the predefined minimum cross-section is separated by only a single radially arranged row of the ribs serving for dissipating thermal energy having cross-sections that are less than the predefined minimum cross-section so that each single radially arranged row of ribs formed as supporting elements alternates with each single row of ribs for dissipating thermal energy in a circumferential direction.

2. The axle-mounted brake disk of claim 1, wherein the number of ribs of the second subset arranged radially behind each other is greater than the number of ribs of the first subset arranged radially behind each other.

3. The axle-mounted brake disk of claim 1, wherein the cross-section of the ribs of at least one subset of ribs is formed so as to increase towards an outer edge of the friction rings.

4. The axle-mounted brake disk of claim 1, wherein length of the ribs close to an inner edge of the friction rings is greater than a length of the ribs close to an outer edge of the friction rings, wherein a thickness of the friction rings close to the inner edge is reduced relative the ribs closer to the outer edge.

5. The axle-mounted brake disk of claim 1, wherein a ratio of a cross-section of each of the ribs formed as supporting elements to a cross-section of each of the ribs serving for thermal energy dissipation is 3:2.

6. The axle-mounted brake disk of claim 1, wherein the plurality of ribs are formed round, oval or polygonal in cross-section.

* * * * *